United States Patent Office 3,122,721
Patented Feb. 25, 1964

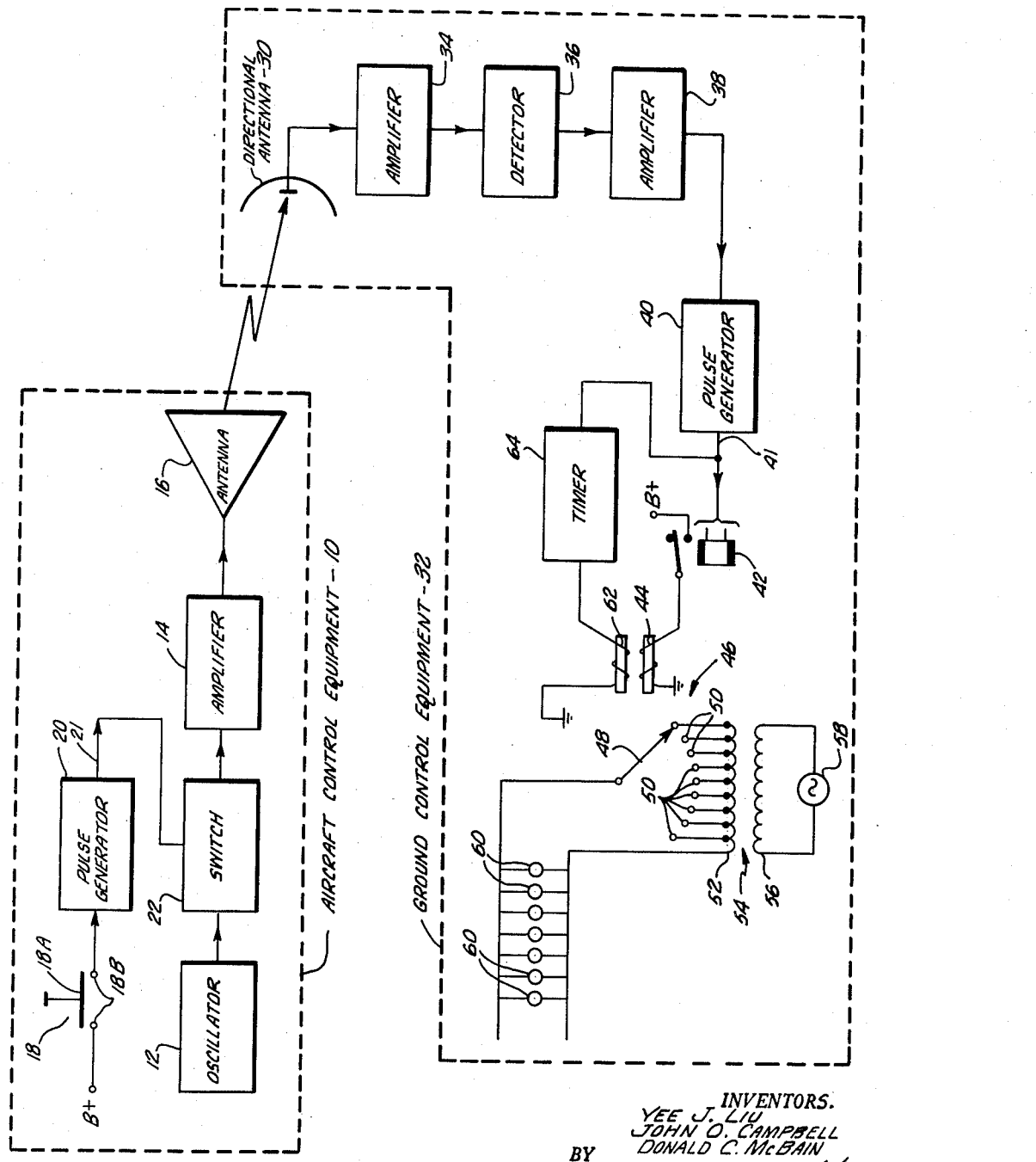

3,122,721
AIRPORT APPROACH RUNWAY LIGHT
DIMMING APPARATUS
Yee J. Liu, 15801 Hart St., Van Nuys, Calif.; John O.
Campbell, 5227 Knowlton St., Los Angeles, Calif.; and
Donald C. McBain, 533 Marguerita St., Santa Monica,
Calif.
Filed July 21, 1960, Ser. No. 44,440
6 Claims. (Cl. 340—25)

The present invention relates generally to light dimming apparatus and in particular to apparatus for controlling runway approach illumination at a landing field for aerial vehicles.

Landing fields for aerial vehicles such as aircraft are generally provided with a row of lights such as electric lamps which mark the runway approach. The purpose of this lighting arrangement is to aid the pilots of aircraft in their approach to the runway during times of poor visibility such as night time or when the runway is obscured by fog, clouds, etc. Usually the pilots in the aircraft are at an altitude of approximately one thousand feet and at a distance of about four miles from the landing field when they first see the lights. As the aircraft approach the runway and lose altitude the lights appear brighter to the pilot since the light flux density increases with decreasing distance. When the pilot is directly above the lights, the light intensity is frequently very high which sometimes causes a pilot to experience a few moments of blindness after passing over the lights while the pilot's eyes are becoming accommodated to the lower light intensity on the runway itself. In order to alleviate this dangerous situation the pilot usually asks the airport tower controller to dim the approach lights. This procedure is not only an inconvenience to the tower controller but adds an additional burden to the tower-pilot radio communication link.

The above problems are overcome by the present invention in which the illumination intensity of the runway approach lights is controlled from the aircraft approaching the runway. In accordance with the present invention transmitting means are carried by an aerial vehicle such as an aircraft for transmitting discrete control signals. Additional means are carried by the aerial vehicle and coupled to the transmitting means for selectively rendering the transmitting means operative to transmit each control signal. Receiving means are disposed adjacent the landing field to receive the control signals. Illuminating means are provided for illuminating the approach to the field and control means are coupled between the receiving means and the illuminating means for decreasing the intensity of the illumination produced by the illuminating means a predetermined amount in response to the reception of each control signal. The apparatus of this invention permits the pilot of an aircraft approaching a landing field to dim the approach lights in successive increments during the approach to the landing field to permit the lights to guide him to the field while preventing the light intensity from causing temporary blindness when the aircraft passes very close to the runway approach lights.

This invention is described in more detail in reference to the accompanying drawing which is a schematic block diagram of a light intensity control apparatus in accordance with the present invention.

Referring now to the drawing, each aircraft which is to control the runway approach illumination is provided with an aircraft control equipment 10. This aircraft control equipment includes transmitting means such as a high frequency oscillator 12, an amplifier 14 and an antenna 16. Pilot control means such as push button switch 18, a pulse generator 20 and a switch 22 are also carried by the aircraft for selectively rendering the transmitting means operative to transmit a control signal as will be more fully described.

The push button switch 18 includes a movable contact 18A and a pair of stationary contacts 18B and is arranged to connect the pulse generator to an actuating voltage such as B+ when the movable contact 18A is depressed to engage the contacts 18B. A suitable spring (not shown) may be provided in the switch 18 to disengage the contacts 18A and 18B when the pressure on the movable contact 18A is removed. The pulse generator 20 may be of any well known design (such as a monostable multivibrator) and is arranged to generate a pulse at the output 21 of a predetermined time duration when actuated by the high voltage signal B+ through the switch 18. The output signal from the pulse generator 20 is coupled to the switch 22 which may be of an electronic type and is arranged to couple the oscillator 12 to the amplifier 14 during the time that a pulse is present in the output of the pulse generator 20. Thus when push button 18 is actuated, a single pulse of radio frequency energy having a given amplitude, time duration and frequency (controlled by the frequency of oscillator 12) is radiated from the antenna 16.

This radiated control signal is picked up by a directional antenna 30 which is a portion of the ground control equipment 32 located adjacent the landing field. The directional antenna 30 is directed along the glide or approach path for the landing field to prevent signals from aircraft approaching nearby runways from jamming or interfering with the light control apparatus. The directional antenna 30 is coupled to an amplifier 34, a detector 36 and another amplifier 38 as shown which form a receiver for receiving and detecting the control signals transmitted from the aircraft control equipment 10.

The receiver provides an output signal from the amplifier 38 in response to the reception of each control signal by the antenna 30. The output signal from the amplifier 38 is applied to the input of a pulse generator 40. The pulse generator 40 may be of any well known type and is arranged to supply an output pulse of suitable characteristics such as positive D.C. pulse of a given time duration at the output circuit 41 in response to an output signal from the amplifier 38. The output of the pulse generator 40 energizes a relay 42 which closes a contact to energize an actuating coil 44 of a stepping switch indicated generally at 46. When the coil 44 is energized, the rotary contact 48 of the stepping switch 46 is rotated in a clockwise direction to engage the next of the stationary contacts 50. The stationary contacts 50 of the stepping switch are connected to separate turns of a secondary winding 52 of a transformer 54 as shown. The primary winding 56 of the transformer is connected across a suitable source of alternating current potential 58. A plurality of electric lamps 60 are positioned to illuminate the approach to the runway and are connected between the rotary contact 48 and one side of winding 52 as shown so that the voltage applied across the lamps and the intensity of illumination produced by the lamps 60 decreases in successive increments when the rotary contact 48 is rotated in a clockwise direction. A reset coil 62 of the stepping switch 46 is coupled to the output of a timer 64, the input of which is coupled to the output 41 of the pulse generator 40 as shown. The timer 64 is arranged to measure the elapsed time after each output signal from pulse generator 40 and to supply an energizing current to the resetting coil 62 when the elapsed time reaches a predetermined value. Each output signal from the pulse generator 40 resets the timer 64. Thus the timer 64 and the resetting coil 62 function to reset the stepping switch 46 to the position shown in the drawing in response to a predetermined time lapse after the reception of the last control signal by the antenna 30. This time interval (i.e. 10 to 60 seconds) should be sufficient to allow the approaching aircraft to pass over the runway approach lights and reach the runway. After the last light intensity adjustment by the pilot of a landing aircraft the runway approach illumination will be restored to its original brightness so that the pilot of the next approaching aircraft can readily see the runway approach lights.

If desired, the timer 64 may be replaced by an electric eye circuit positioned to detect the passage of an aircraft across the runway so that the stepping switch 46 will be reset after the approaching aircraft has actually landed on the runway itself.

In operation the pilot of an aircraft approaching the landing field actuates the push button switch 18 each time he wishes to lower the intensity of the runway approach illumination. The number of increments through which the intensity of the runway approach illumination may be decreased is of course dependent upon the number of stationary contacts 50 that are provided in the stepping switch 46. This number may be chosen at any desired value. The range from which the dimming control apparatus is operable is determined by the power transmitted by the transmitting means in the aircraft and the sensitivity of the receiving means of the ground control equipment. This range may be limited to a suitable distance, for example, 20 miles by limiting the power of the transmitted control signal.

Various modifications of the dimming control apparatus of the present invention will be readily obvious to those skilled in the art. For example, the discrete control signals transmitted by the aircraft control equipment 10 could be in the form of frequency or amplitude coded continuous wave radio frequency signals. Also the stepping switch 46 could be replaced by a suitable magnetic amplifier and integrating circuit for decreasing the voltage supplied to the runway approach lamps 60 in successive increments in response to the reception of successive control signals by the ground control equipment 32.

We claim:

1. An apparatus for controlling runway approach illumination at a landing field for aerial vehicles comprising transmitting means carried by at least one aerial vehicle for transmitting a plurality of discrete control signals, switching means carried by the aerial vehicle and coupled to the transmitting means for selectively rendering the transmitting means operative to transmit each control signal, receiving means disposed adjacent to the landing field for receiving the control signals transmitted by the aerial vehicle when the aerial vehicle is approaching the landing field, illuminating means for illuminating the approach to the field, control means coupled between the receiving means and the illuminating means for decreasing the intensity of the illumination produced by the illuminating means a predetermined amount in response to the reception of each of a plurality of control signals received within a preselected time interval and restoring means coupled between the receiving means and the illuminating means for restoring the intensity of the illumination produced by the illuminating means to a predetermined value after a preselected time interval from the reception of the last control signal.

2. An apparatus for controlling runway approach illumination at an airfield by aircraft approaching the field, comprising transmitting means carried by a plurality of aircraft for transmitting a plurality of individual control signals, switching means carried by each of the aircraft and coupled to the transmitting means thereof for selectively rendering the transmitting means operative to transmit each control signal, a directional antenna disposed adjacent to the field for receiving the control signals which are transmitted from each of the aircraft making an approach to the field from a preselected direction and within a preselected distance from the field, a receiver coupled to the antenna for detecting the control signals received by the antenna, a plurality of electric lamps positioned along the approach to the field, a source of operating potential for the electric lamps, voltage control means connected between the lamps and the potential source for selectively controlling the magnitude of the voltage applied across the lamps and means coupled between the receiver and the voltage control means for controlling the operation of the voltage control means so that the voltage applied across the lamps is decreased a predetermined amount in response to the reception of each control signal and means coupled to the voltage control means for increasing the voltage applied across the lamps to a preselected value in response to a predetermined time lapse after the reception of the last control signal.

3. The combination as defined in claim 2 wherein the voltage control means includes a stepping switch having an actuating coil connected between the lamps and the potential source, the stepping switch being arranged to decrease the voltage applied to the lamps a predetermined amount in response to each energization of the actuating coil.

4. The combination as defined in claim 3 wherein the means for controlling the operation of the voltage control means includes a pulse generator and means connected between the pulse generator and the actuating coil of the stepping switch for energizing the actuating coil in response to the reception of each control signal.

5. An apparatus for controlling runway approach illumination at an airfield comprising transmitting means carried by a plurality of aircraft for transmitting discrete control signals, first switching means, first pulse generating means and second switching means carried by each of the aircraft, means for connecting the first switching means to the first pulse generating means of each aircraft, means for connecting the pulse generating means to the second switching means of each aircraft, each of the pulse generating means being arranged to apply an output pulse of a predetermined amplitude and time duration to the second switching means in response to the actuation of the first switching means, each of the second switching means being arranged to render the transmitting means operative to transmit a control signal for the duration of the output pulse from the respective first pulse generating means, a directional antenna disposed adjacent the airfield for receiving the control signals which are transmitted from each of the aircraft making approach to the airfield from a predetermined direction and within a preselected range of the airfield, a receiver coupled to the antenna for detecting the control signals received by the antenna, a plurality of electric lamps positioned along the approach to the field, a source of operating potential for the electric lamps, a stepping switch having an actuating coil and a reset coil and being connected between the source of operating potential and the electric lamps for decreasing the amplitude of the potential applied to the lamps a predetermined amount in response to each energization of the actuating coil, the stepping switch being further arranged to restore the amplitude of the potential applied to the lamps to a preselected value in response to the energization of the reset coil, second pulse generating means connected between the receiver and the actuating coil for energizing the actuating coil in response to the detection of each control signal by the receiver, and timing means connected between the pulse generator and the reset coil for energizing the reset coil in response to a predetermined time lapse after the reception of the last control signal by the receiver.

6. In an apparatus for controlling runway approach illumination at a landing field for aerial vehicles the combination which comprises transmitting means carried by an aerial vehicle for transmitting discrete control signals, means carried by the aerial vehicle and coupled to the transmitting means for selectively rendering the transmitting means operative to transmit each control signal, receiving means disposed adjacent the field for receiving the control signals, illuminating means for illuminating the approach to the field and control means coupled between the receiving means and the illuminating means for decreasing the intensity of the illumination produced by the illuminating means a predetermined amount in response to the reception of each control signal, and for increasing the intensity of the illumination produced by the illuminating means to a predetermined value when a preselected time interval has elapsed after the reception of the last control signal.

References Cited in the file of this patent

UNITED STATES PATENTS

| | | |
|---|---|---|
| 1,468,729 | O'Hara | Sept. 25, 1923 |
| 1,815,045 | Boddie et al. | July 21, 1931 |
| 2,563,250 | Lacks | Aug. 7, 1951 |
| 2,655,606 | Trimble | Oct. 13, 1953 |
| 2,655,644 | Rees | Oct. 13, 1953 |
| 2,853,654 | Swasey | Sept. 23, 1958 |